A. P. BRUSH.
POTATO PLANTER.
APPLICATION FILED SEPT. 14, 1917.
1,256,292.
Patented Feb. 12, 1918.
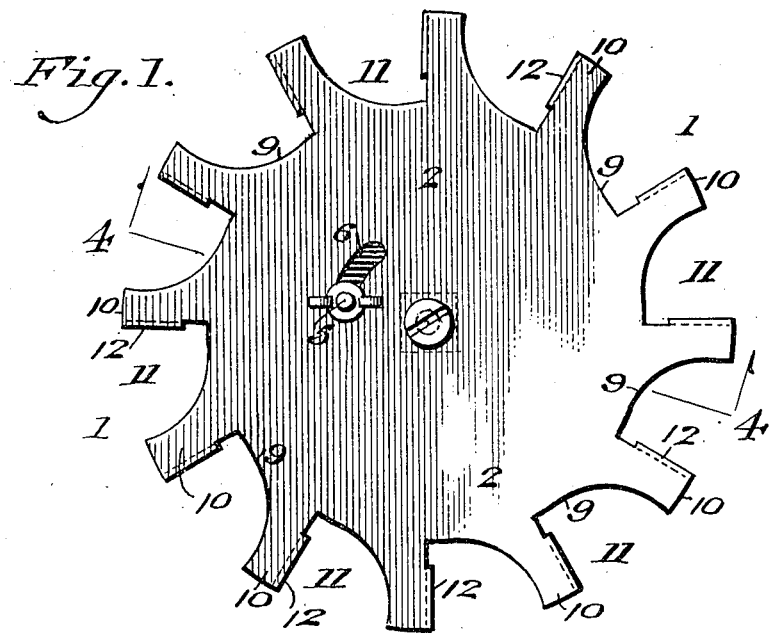
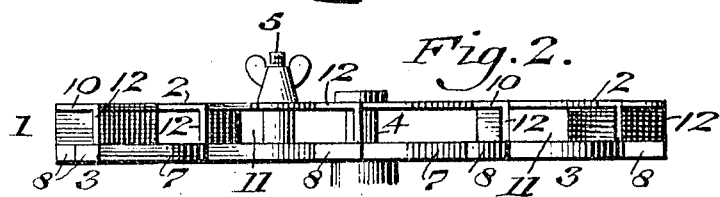
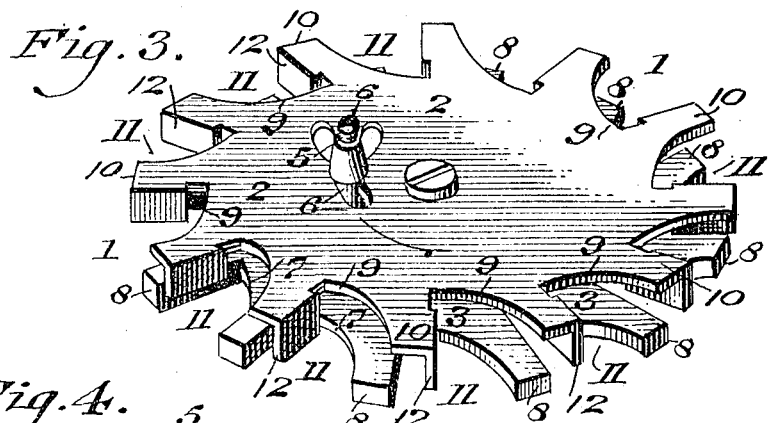
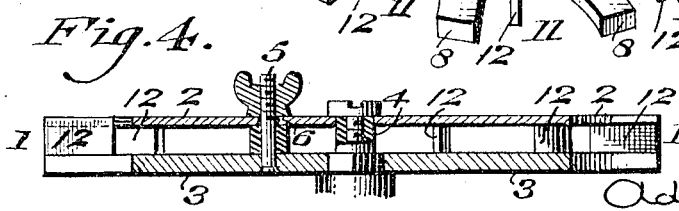
INVENTOR
Addison Platt Brush
BY Diederohein + Fairbanks
ATTORNEYS

UNITED STATES PATENT OFFICE.

ADDISON PLATT BRUSH, OF QUINBY, VIRGINIA, ASSIGNOR OF ONE-HALF TO HALLACK A. PENROSE, OF PHILADELPHIA, PENNSYLVANIA.

POTATO-PLANTER.

1,256,292. Specification of Letters Patent. Patented Feb. 12, 1918.

Application filed September 14, 1917. Serial No. 191,352.

*To all whom it may concern:*

Be it known that I, ADDISON PLATT BRUSH, a citizen of the United States, residing at Quinby, in the county of Accomac, State of Virginia, have invented a new and useful Potato-Planter, of which the following is a specification.

My invention relates to a potato planter which is provided with a wheel having pockets adapted to receive the seed potatoes and feed them to the ground, the object being to avoid a series of wheels for the seeds of different sizes.

The invention consists in forming a wheel with pockets which are adjustable in such manner as to receive the seed potatoes of different sizes.

The invention is satisfactorily illustrated in the accompanying drawing, but the important instrumentalities thereof may be varied, and so it is to be understood that the invention is not limited to the specific details shown and described, as long as they are within the spirit or scope of the claims.

Figure 1 represents a top or plan view of a portion of a potato planter embodying my invention.

Fig. 2 represents a side elevation thereof.

Fig. 3 represents a perspective view thereof.

Fig. 4 represents a diametrical section on line 4—4 Fig. 1.

Similar numerals of reference indicate corresponding parts in the figures.

Referring to the drawings, 1 designates the feed wheel of a potato planter, the same consisting of the upper plate 2, and the bottom plate or templet 3 which with said upper plate are mounted on the bolt 4, the latter being connected with the frame of the planter adapting the wheel to rotate in usual manner. The templet is fixed to said bolt, and the upper plate rotatably mounted on the latter and adapted to be coupled to said templet so as to rotate therewith as one by means of the set screw 5, and a suitable thumb nut thereon, said screw being secured to the templet 3 and rising therefrom is passed through said slot 6 which is formed in the upper plate by which provision said upper plate may be adjusted to the right or left on the templet to the extent of said slot. When said nut is tightened the templet and upper plate may be rotated as one, said plate then retaining its adjusted position on the templet.

The periphery of the templet is cut away at intervals as 7 forming the outwardly projecting fingers 8 on said periphery. The periphery of the top plate is cut away at intervals as at 9, forming the outwardly projecting fingers 10 on said periphery, it being noticed said fingers 10 are raised above the fingers 8 forming the pockets 11, the bases of which are the fingers 8 on which the seed is to be placed and supported temporarily.

Depending from a side of each finger 10 is a flange 12 which extends downwardly therefrom to the adjacent side of the fingers 8 of the templet and so may project into the pockets 11 and in a measure close one side of the pocket 11 as guards therefor, it being noticed that the opposite side of said pocket is open whereby the seed potatoes can be inserted into the pocket and placed on the fingers 8 and as the wheel is thus fed with the seed the latter thus being visible to the driver of the planter, this being due to the open top of the pockets, and it is rotated it carries around the seed supplied to the pockets until a pocket reaches a part of the organized planter when it is discharged and so dropped to the ground at the proper intervals.

Should it be desired to plant smaller seed the screw of the axis 4 and the nut of the screw 5 are loosened and the upper plate turned in the proper direction, in the present case to the right, to the required extent to decrease the width of the pockets. The said screw and nut are tightened and the pockets retain their adjusted size. Should it be desired to plant again larger seed, the screw and nut are loosened, and the upper plate is turned in the other direction whereby the width of the pockets is increased to the extent required, but in either case the fingers 8 afford full support for the potatoes placed therein. Then said screw and nut are tightened and the pockets retain their adjusted size so that in all cases while the seed rests on the fingers 8 the seed are backed by the advancing flanges 12 so that they will remain in the pockets on the bottom fingers thereof as the wheel rotates without liability to slip backward owing to said flanges acting as stops or abutments for the seed at the backs of the latter.

Having thus described my invention what

I claim as new and desire to secure by Letters Patent, is:—

1. In a potato planter, a feed wheel composed of a templet and a top plate, each having outturned fingers on the periphery thereof, the finger of the top plate having on its side a depending flange which overhangs the side of the finger of the templet, forming seed receiving pockets, said top plate being rotatably movable on said templet whereby said pockets may be adjusted to seed of varying size, and means for retaining said top plate in the adjustment of said pockets.

2. In a potato planter, a feed wheel composed of a templet and a top plate, an axis for the wheel, said top plate being rotatable on said templet, outwardly projecting fingers on the peripheries of said templet and top plate and a flange on the top plate, the same overhanging the side of the finger of the templet forming seed receiving pockets, said plate having therein a segmental slot, and said templet having thereon a screw-like member adapted to enter said slot, and a tightening device on said member.

3. In a potato planter, a feed wheel composed of a templet, and a top plate rotatable one in the other, outturned fingers on the peripheries of said plate and templet forming together seed receiving pockets on the periphery of the wheel, and a flange on a side of the finger of the top plate overhanging the side of the finger of the templet adapted to form stops on the sides of said pockets, said flanges being movable with fingers with which they are connected adapting said pockets to be adjustable to seed of varying size.

ADDISON PLATT BRUSH.

Witnesses:
G. B. DOWNING,
J. B. DOWNING.

Copies of this patent may be obtained for five cents each, by addressing the "Commissioner of Patents, Washington, D. C."